April 21, 1970     J. A. MORALE     3,508,201

TRANSLATOR CIRCUIT

Filed March 17, 1967     2 Sheets-Sheet 1

INVENTOR
J. A. MORALE
By R. P. Miller
ATTORNEY

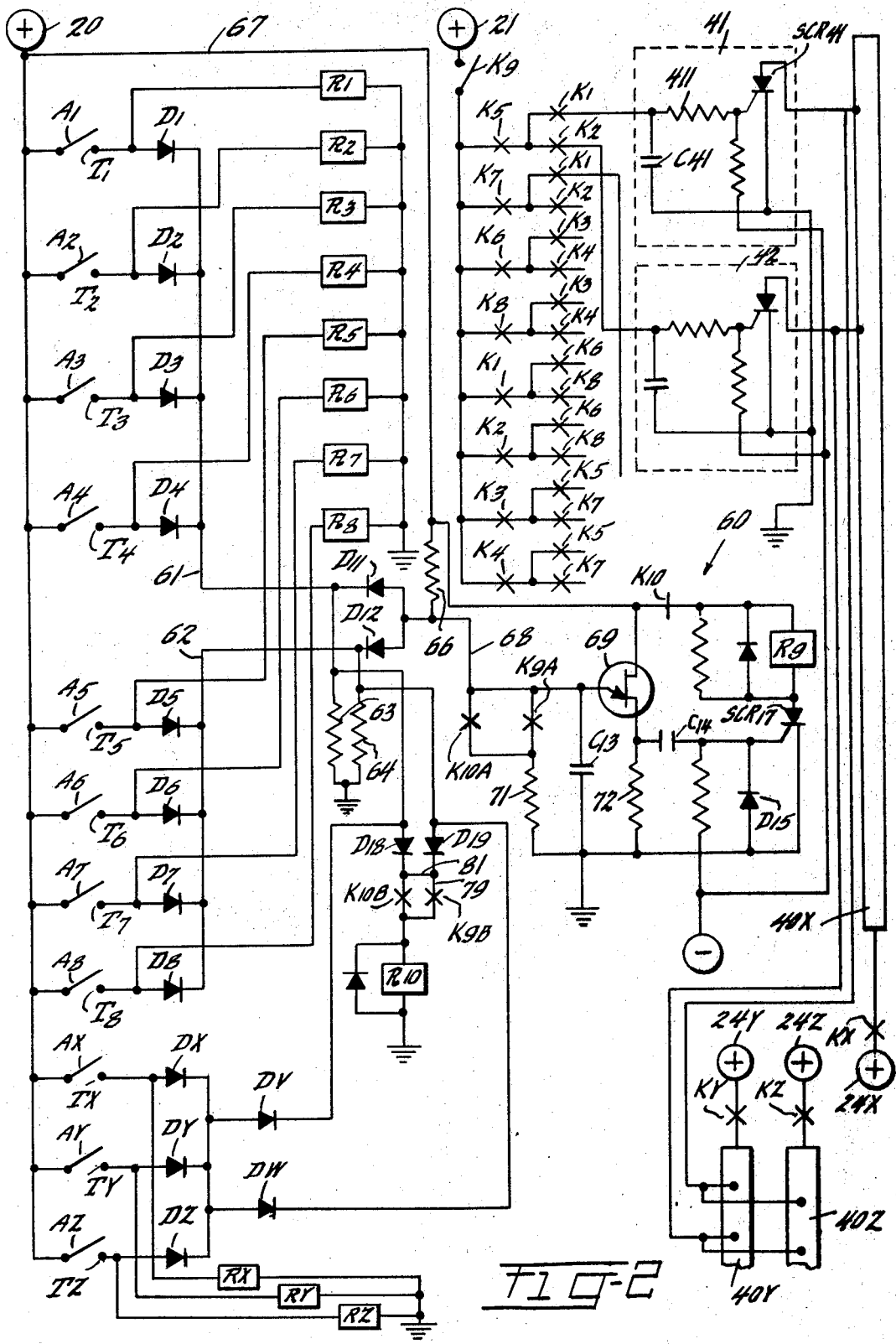

United States Patent Office 3,508,201
Patented Apr. 21, 1970

3,508,201
TRANSLATOR CIRCUIT
Joseph A. Morale, Brooklyn, N.Y., assignor to Western Electric Company, Incorporated, New York, N.Y., a corporation of New York
Filed Mar. 17, 1967, Ser. No. 624,070
Int. Cl. H04q 3/02
U.S. Cl. 340—147                                              13 Claims

ABSTRACT OF THE DISCLOSURE

A translator circuit receives a pair of intelligence pulses at input terminals in a pair of separate banks, and selectively operates relays to close associated contacts for conditioning a current path to one of a group of selected output drive circuits. If the input pulses are of sufficient duration and are simultaneously received, a triggering switch is closed to apply power to the conditioned current path to operate the selected output drive circuit. The translator circuit is conditioned for the next operation only after all the pulses are removed from input terminals.

BACKGROUND OF THE INVENTION

Translator circuits of the type in which coded multifrequency input signals are used to operate a selected mechanism in an output utilization circuit are known (e.g., see Western Electric Patent No. 3,229,279 to Edgren et al. and Western Electric Patent No. 3,131,259 to Di Iorio et al.). Such circuits receive the signals and produce pulses to select and operate relays for completing current paths between a power source and a selected output utilization circuit, which in turn may operate a recording device. False activation may, however, be occasioned through reception of noise or other extraneous locally produced pulses. Moreover, continuous application of input pulses to the circuit will result in repetitive activation of the translator circuit and the output utilization circuit, with a concomitant spurious operation and the possibility of damage to circuit components caused by overheating.

SUMMARY OF THE INVENTION

In accordance with the invention, the translator circuit is only operated upon the simultaneous application thereto of a group of coded pulses for a predetermined time duration. Upon receipt of each coded signal, pulses are applied to selected relays within a number of banks which are equal in number to the number of pulses in each complete signal. For example, in one coded communication system an eight unit code is used and two signal pulses are generated and permutatively positioned within first and second four-unit groupings. In this two-out-of-eight code, the first pulse is applied to operate a selected relay of a first bank of four relays and the second pulse is applied to operate a selected relay of a second bank of four relays.

According to the present invention, the operation of these two relays cooperates to select and condition an output utilization circuit from a large group of selectable utilization circuits. The simultaneous receipt of the first and second pulses initiates the operation of a timing circuit, which, after elapse of a predetermined time, applies power through the selected conditioned current to energize a desired output utilization circuit. This timing circuit includes a capacitor, the charging of which is controlled by the simultaneous application of the input pulses to a diode gating device. When the capacitor accumulates a predetermined charge, after a period of time, further relay circuitry is operated to control the application of power to the selected conditioned circuit. It will be noted that the output circuit is not operated until two conditions are satisfied; namely, the simultaneous application of the input pulses and the presence of those pulses for a predetermined time.

Additional circuit-protecting facilities are provided to interrupt the control relay circuitry, to preclude conditioning of the unit for the next operation until the input pulses are removed and a new set of two input pulses are applied respectively to the two banks of relays.

BRIEF DESCRIPTION OF THE DRAWING

Other advantages of the invention may be appreciated upon consideration of the following detailed description when considered in conjunction with the accompanying drawing wherein:

FIG. 2 shows an alternative embodiment of the invention in the form of a three-out-of-eleven code translator circuit.

DETAILED DESCRIPTION

The basic circuit

Figure 1:
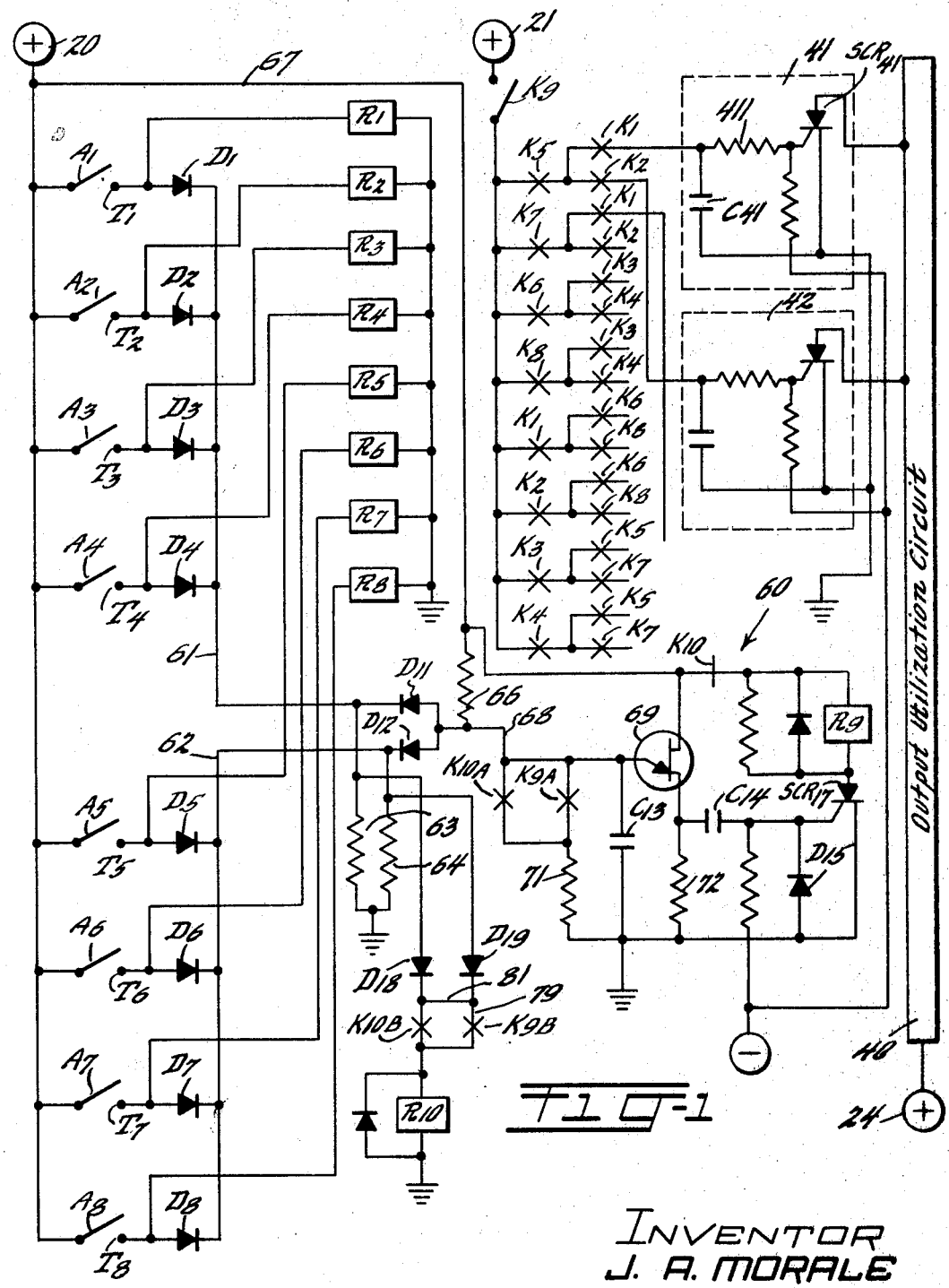
FIG. 1 of the drawing illustrates a two-out-of-eight code translator circuit embodying the principles of the invention.

Referring to FIG. 1, a translator circuit is shown constructed in accordance with the invention to include a pair of multi-channel receiving terminals designated by the reference numerals T1 to T4 and T5 to T8. Signals in the form of pairs of coded intelligence pulses may be applied to the terminals in any suitable manner, as by the closure of selected ones of contacts A1 to A4 and A5 to A8, which apply a positive DC potential from an energy source 20 to the terminals associated with the closed contacts for the duration of such closure. It is to be understood that pulses may be derived from other systems rather than by the closure of contacts. For example, the pulses may be applied by a local signal generator or by a distributor associated with radio receiving equipment. The transmitted or locally generated intelligence signals are received and applied to terminals T1–T8 and are used by the embodiment illustrated in FIG. 1 to selectively operate a conventional output utilization circuit 40, for example to control a teletypewriter or perforator, through a selected one of a plurality of output drive circuits 41, 42, etc.

The coded system used in the illustrated embodiment of the invention shown in FIG. 1 is operable as a two-out-of-eight code translater circuit. That is, a different one of the output drive circuits 41, 42, etc. is selected by the circuit for each input consisting of (1) a first intelligence pulse applied to an input terminal of the first multi-channel bank or group of intelligence receiving input terminals T1 to T4, concurrent with (2) a second intelligence pulse applied to an input terminal of the second multi-channel bank of input terminals T5 to T8. An additional criterion is set for the energization of a selected output drive circuit by the circuit of FIG. 1; namely, to avoid unwanted energization caused by short pulses due to random line noise or spuriously generated local signals, the intelligence signals must be impressed upon the respective input terminals, for example the terminals T1 and T5, simultaneously for at least a time period of predetermined duration.

All of the pulsing switches A1 to A8 are connected to the energy source 20, and each input terminal T1 to T8 is coupled both to one of a group of diodes D1 to D8 and to a different relay R1 to R8. Each relay R1 through R8 operates to close a different plurality of normally open gating means comprising contact pairs K1 to K8 which are energized through application of an intelligence pulse to the associated input terminal. Thus, three pairs of contacts K1 are closed by the energized relay R1 upon the closing of the pulsing switch A1 across the input terminal T1. Likewise, the closing of the pulsing switch A2 across the input terminal T2 will cause the relay R2 to close three different pairs of contacts K2. Pluralities of contact pairs K3 through K8 are similarly associated with the relays R3 through R8.

One terminal of a triggering switch K9 is connected to a power or energy source 21, for example a positive potential of 18 volts, for energizing the selected one of the output drive circuits 41, 42, etc. The other terminal of the triggering switch K9 is connected in common in a plurality of output selecting circuits constituting normally disabled gating circuits. Each output gating or selecting circuit includes one of the pairs of contacts K1 to K4 and one of the pairs of contacts K5 to K8. No two output selecting circuits include the same two contact pairs. Each possible combination of two contact pairs, one associated with one of the input terminals T1 to T4 and one associated with one of the input terminals T5 to T8, is present in a different output selecting or gating circuit line between the triggering switch K9 and a different one of the output drive circuits 41, 42, etc. Thus, the closing of one of the pairs of contacts K1 to K4 such, as the contact pair K1, and one of the pairs of contacts K5 to K8, such as the contact pair K5, will complete a gating circuit and thus provide a conditioned current path to a different one of the output drive circuits, in this case the circuit 41, for energization upon the closing of the triggering switch K9.

A control relay R9, connected in a control gating circuit 60, is operable to close the normally open triggering switch K9 between the potential source 21 and the output selecting or gating circuit. The control circuit 60 operates to energize the control relay R9 only upon the impressing of signals on two of the input terminals T1 to T8, one in each bank, simultaneously for at least a predetermined time. The control circuit 60 will be described and illustrated by explaining the operation of this circuit upon the simultaneous closure of contact pairs A1–T1 and A5–T5.

The source of potential 20 is normally connected to ground through a line 67, a large resistor 66, and parallel paths consisting of the diodes D11 and D12 and small resistors 63 and 64. The potential drop across the resistor 66 in this normal condition is sufficient to maintain a unijunction transistor 69 in a cut-off state. Should an input terminal in one bank, such as represented by the closure of contacts A1–T1, receive an intelligence pulse, one of the diodes D11 or D12 would become reversed-biased. The connection of the potential source 20 to ground through the resistor 66 and through the other of the diodes D11 or D12 and its resistor 63 or 64 would then still maintain the unijunction transistor 69 at a potential level insufficient for firing.

However, the simultaneous closing of a contact and an input terminal in each bank, such as represented by the closure of contact pairs A1–T1 and A5–T5, will reverse-bias both diodes D11 and D12 so as to begin charging a capacitor C13 through a circuit which may be traced from the positive terminal of the energy source 20 through the line 67 and the resistor 66, across the capacitor C13, and to ground. As the capacitor C13 charges, a raised potential is impressed on the emitter terminal of the unijunction transistor 69. After a predetermined time established by the time constant of the charging circuit, the potential will be raised to a value sufficient to bias the unijunction transistor 69 into a conductive state.

Upon firing of the unijunction transistor 69, there is a current surge through a resistor 72 causing a positive-going voltage pulse to be impressed through a capacitor C14 to a control electrode of a silicon-controlled rectifier SCR 17, rendering it conductive. Conduction of the silicon-controlled rectifier completes a bypass circuit across the unijunction transistor to reduce the potential across its base electrodes to such an extent that conduction is no longer sustained. However, due to the inherent operating characteristics of the silicon-controlled rectifier, it will remain in a conductive state until a normally closed contact K10 is opened to disconnect the rectifier from the energy source 20.

The control relay R9 is energized upon the conduction of the silicon-controlled rectifier. The relay closes the triggering switch K9, and energy from the source 21 is applied through the selected gating circuits K1, K5, over a line to a resistor 411 and a capacitor C41. The resulting current surge across the resistor 411 causes a potential drop to appear across the capacitor C41, and a second silicon-controlled rectifier SCR 41 is rendered conductive. The output utilization circuit 40, including a source of potential 24, is now completed to ground through the silicon-controlled rectifier SCR 41 of the selective output drive circuit 41, causing the activation of an associated mechanism in the output utilization circuit 40.

The energization of the control relay R9 also closes the normally open contacts K9A between a line 68 and a resistor 71 and also closes the normally open contacts K9B in a line 79. The closing of the contacts K9A allows the capacitor C13 to begin discharging through the resistor 71. The closing of the contacts K9B energizes a circuit protecting relay R10 from energy source 20, through the closed contacts A1–T1 and A5–T5, through the diodes D1 and D5, lines 61 and 62 and a pair of diodes D18 and D19.

The energization of the circuit protecting relay R10 opens the normally closed contacts K10 and closes the normally open contacts K10A and the normally open locking contacts K10B. The closing of the contacts K10B provides a current path for maintaining the circuit protecting relay R10 energized. The closing of the contacts K10A provides an alternate path for discharge of the capacitor C13. The opening of the contacts K10 deenergizes the control relay R9 by isolating it from the energy source 20. The opening of contact K10 also effectuates the interruption of the conduction of the silicon-controlled rectifier SCR 17 so that now the unijunction transistor 69, the relay R9 and the silicon-controlled rectifier SCR 17 are restored to the initial unoperated condition. Though the signal is still impressed on the terminals T1 and T5, the capacitor C13 cannot recharge due to the closure of the contact K10A in the discharge circuit of the capacitor.

The deenergization of the control relay R9 results in the restoration of contacts K9, K9A, and K9B to their normal open conditions. The opening of triggering switch K9 results in the selected output drive circuit 41 being cut off from the source of energy 21. However, the operation of the output drive circuit is maintained by the continued operation of the silicon-controlled rectifier SCR 41 so as to effectuate the desired operation of the output utilization circuit to perform its designated function. Facilities (not shown), such as opening a contact, within the output utilization circuit are utilized to interrupt the energy source 24 upon completion of operation of the output utilization circuit. It may be appreciated that since the triggering switch K9 can thus remain closed for only a relatively short period of time, overheating-caused damage to the output and control circuits is prevented.

The relay R9 is maintained deenergized as long as one or more of the input terminals T1 to T8 has a signal pulse supplied thereto. This may be appreciated because the energization circuit for the relay R10 may be traced from the energy source 20 through any of the closed contacts A1 to A8 through the associated diode D1 to D8 and either or both of the diodes D18 to D19 and a crossover lead 81, through the locking contact K10B, and the coil of the relay R10 to ground. However, upon opening of all the contacts of A1 to A8, the relay R10 is deenergized to close the contact K10 to condition the circuit 60 for subsequent operation.

In summary, it may be appreciated that there must be a first intelligence pulse placed on one of the terminals T1 to T4 and a second intelligence pulse placed on one of the terminals T5 to T8 before the circuit conditions are set up to enable the start of the charging of the capacitor C13. If one or the other input signals is interrupted before the capicitor C13 charges to fire the unijunction transistor 69, the selected and conditioned output drive circuit will not be operated because the relay R9 is not operated until after operation of the unijunction transistor 69 and the silicon-controlled rectifier SCR 17. Further, the presence of the relay R10 precludes resetting of the control circuit 60 until such time as all the intelligence impulses have been removed from both banks of input terminals T1 to T8. This relay will thus function to prevent spurious reoperation of the translator circuit in response to prolonged applications of input intelligence pulses.

AN ALTERNATIVE EMBODIMENT

Referring now to FIG. 2, a three-out-of-eleven code translator circuit in accordance with the principles of the invention is illustrated. This circuit differs from that shown in FIG. 1 by virtue of the presence of an additional bank of intelligence receiving input terminals which includes the output selecting terminals TX, TY, and TZ for selecting among three output utilization devices 40X, 40Y, and 40Z. To the extent that the circuit of FIG. 2 corresponds to that of FIG. 1, identical reference numerals are employed.

Three additional pulsing switches AX, AY, and AZ are coupled in common to the source of potential 20. The closing of each pulsing switch AX, AY, or AZ will apply an intelligence signal to a different associated one of the output selecting input terminals TX, TY, or TZ. Three relays RX, RY, and RZ are each associated with a different output selecting input terminal TX, TY, or TZ, and are each coupled between the associated output selecting input terminal and ground.

The three output utilization circuits 40X, 40Y, and 40Z are coupled in parallel to each output drive circuit 41, 42, etc. These three output utilization circuits take the place of the single output utilization circuit 40 of FIG. 1. Each output utilization circuit may have its own source of potential 24X, 24Y, or 24Z. Three pairs of normally open output circuit selecting contacts KX, KY, and KZ are coupled each between one of the sources 24X, 24Y, or 24Z and the associated output utilization circuit 40X, 40Y, or 40Z. Alternatively, a single source of potential might replace the three sources 24X, 24Y, 24Z. The contacts KX, KY, and KZ would then be located in parallel lines between the single source and the three output utilization circuits 40X, 40Y, and 40Z.

The closing of one of the pairs of output circuit selecting contacts KX, KY, or KZ selects one among the output utilization circuits to be activated when the triggering switch K9 is closed. The energization of one of the relays RX, RY, or RZ closes an associated pair of the contacts KX, KY, or KZ.

A diode DX has its anode coupled to the input terminal TX and its cathode coupled in common to the anodes of a pair of diodes DV and DW. A diode DY has its anode coupled to the input terminal TY and its cathode also coupled in common to the anodes of the diodes DV and DW. Similarly, a diode DZ has its anode coupled to the input terminal TZ and its cathode coupled in common to the anodes of the diodes DV and DW. The cathode of the diode DV is coupled to the anode of the diode D18. The cathode of the diode DW is coupled to the anode of the diode D19.

OPERATION OF THE ALTERNATIVE EMBODIMENT

The circuit of FIG. 2 operates in essentially the same manner as does the circuit of FIG. 1. The circuit of FIG. 2, however, activates a selected output utilization circuit 40X, 40Y, or 40Z only when one of the output selecting input terminals TX, TY, or TZ of the additional bank receives an input signal in the form of a pulse generated by the closing of one of the pulsing switches AX, AY, or AZ. An input pulse applied, for example, to the output selecting input terminal TX energizes the relay RX to close the normally open contacts KX between the potential source 24X and the output utilization circuit 40X. Thus, upon the closing of the triggering switch K9 with, for example, the contacts K1 and K5 closed, the output drive circuit 41 will activate an associated mechanism in the output utilization circuit 40X.

With the arrangement of the circuit of FIG. 2, the continued closing of one of the pulsing switches AX, AY, or AZ will keep the circuit protecting relay R10 energized after the closing and re-opening of the triggering switch K9. The closed pulsing switch AX, AY, or AZ provides a current path through the diodes DV and DW, the diodes D18 and D19, and the closed contacts K10B. Thus, as in FIG. 1, the continued closing of any of the pulsing switches A1 through A8 and AX through AZ will maintain the triggering switch K9 in its re-opened condition, preventing overheating-caused damage to the output circuits.

It is to be understood that the above-described circuits are simply illustrative of two embodiments of the invention. Many modifications may be made without departing from the invention. For example, the output utilization circuit may be a single alphabetic device responsive to two separate output signals from the translating circuit. One of the output signals would result from the simultaneous impressing of intelligence signals upon the two banks of terminals shown in FIG. 1 through the operation of the circuit of FIG. 1. The other output signal would occur upon an intelligence signal being impressed upon the additional bank of terminals TX, TY, TZ of FIG. 2. Such intelligence signal would energize one of the relays RX, RY, RZ for closing associated contacts in an equal number of parallel lines between the triggering switch K9 and additional associated output drive circuits similar to the output drive circuits 41, 42, etc. Moreover, the embodiment of FIG. 2 might be used to operate three times as many associated mechanisms in a single output utilization circuit. This is possible through a tripling of the number of output drive circuits 41, 42, etc. and a tripling of the number of output selecting circuits, each output selecting circuit including a different combination of one pair of contacts from each of the three groups thereof K1 through K4; K5 through K8; and KX through KZ.

What is claimed is:

1. In a code translator for converting coded first signals comprising two intelligence pulses, impressed respectively on two receiving terminals forming part of a group of more than two receiving terminals, into a second signal for energizing one of a plurality of output circuits.
   means, responsive to the impression of the two intelligence pulses respectively on said two receiving terminals, for selecting and conditioning one of said output circuits for energization, and
   means, including normally inactive switching means activated from a first condition of operation to a second condition of operation by a simultaneous impression of said two intelligence pulses on said two receiving terminals continuing through a predetermined time duration, for energizing said selected and conditioned output circuit.

2. In a code translator as set forth in claim 1:
   means, activated by an initial operation of said energizing means and rendered continuously effective during the continued impression of an intelligence pulse on at least one of said two receiving terminals, for interrupting the continued operation of said energizing means.

3. A code translator as set forth in claim 1 wherein said energizing means comprises:
a first source of power,
a capacitor,
a resistor coupled between the first source of power and the capacitor,
normally disabled gating means coupled to the junction between said resistor and said capacitor for enabling charging of the capacitor through the resistor from said first source of power,
a second source of power,
said normally inactive switching means coupled between the second source of power and all of said output circuits for energizing said selected and conditioned output circuit,
control relay means for activating said switching means,
means connected across said capacitor and responsive to charging of the capacitor for said predetermined time duration for operating said control relay means, and
means responsive to the impression of intelligence pulses on said two receiving terminals for enabling said gating means to charge the capacitor.

4. In a translator circuit which includes a plurality of groups of plural input terminals, a plurality of relays each energized by a pulse applied to an associated input terminal, a plurality of contacts operated by each relay, a plurality of output utilization means, and a plurality of output selecting circuit means each completed by the closing of a different combination of the contacts upon pulses being applied to a particular one of the input terminals of each group for selecting an associated one of said output utilization means, the improvement which comprises:
a source of power,
normally open triggering switch means, forming part of each output selecting circuit means, for connecting the selected output utilization means to said source of power, and
control circuit means operated by the continuous application of pulses simultaneously to an input terminal of each group during a predetermined time period for closing said triggering switch means.

5. A translator circuit as set forth in claim 4 which further comprises circuit protecting means responsive to the closing of said triggering switch means and rendered continuously effective during continued application of a pulse to one of said input terminals for re-opening said triggering switch means.

6. A translator circuit which comprises:
a plurality of intelligence receiving input terminals arranged as a plurality of banks of input terminals,
a plurality of output utilization means each to be operated by intelligence pulses applied to a different set of input terminals, one in each bank, associated therewith,
output selecting and conditioning means responsive to intelligence pulses applied to one input terminal in each bank for conditioning the associated output utilization means for operation upon energization,
a charging circuit,
diode circuits connected to bypass said charging circuit,
means responsive to the concurrent application of intelligence pulses on one terminal in each bank during a predetermined period of time for blocking said diode bypass circuits and operating said charging circuit, and
means responsive to accumulation of a predetermined charge for energizing the conditioned output utilization means.

7. In a system for selecting one of a number of output circuits in response to the application of a multi-pulse input signal:

a plurality of groups of individual input circuits, the number of groups being equal to the number of pulses in said input signal,
means for applying each pulse of said input signal to only one input circuit in each group of input circuits.
means responsive to the application of input pulses to all of said groups of input circuits for conditioning one of said output circuits,
normally open triggering switch means activated by closing for operating said conditioned output circuit, and
gating means rendered effective only upon simultaneous application of pulses in all said groups of input circuits for closing said normally open triggering switch means.

8. A system for selecting an output circuit, as set forth in claim 7, wherein said gating means includes:
a number of diodes each individually associated with a separate group of input circuits, and
a time delay circuit means initiated into operation upon application of the input pulses to all said diodes for closing said triggering switch means.

9. A system for selecting an output circuit, as set forth in claim 8, wherein said time delay circuit includes:
a capacitor charged upon the application of said input pulses to all said input circuits;
control relay means for closing said triggering switch means, and
a control circuit operated by accumulation of a predetermined charge on said capacitor for energizing said control relay means.

10. In a system for selecting one of a number of output circuits in response to the applicaton of a multi-pulse input signal,
a plurality of groups of individual input circuits, means for applying each pulse of said input signal to a particular input circuit for a different group of input circuits,
means responsive to the application of input pulses to all of said groups of input circuits for conditioning one of said output circuits,
normally unoperated triggering means for operating said conditioned output circuit,
a number of diodes each individually associated with a separate group of input circuits,
a capacitor means that is charged upon application of said input pulses to all of said diodes,
a control relay coil rendered effective upon the accumulation of a predetermined charge on said capacitor means for operating said triggering means,
a unijunction transistor operated by the accumulation of said predetermined charge on said capacitor means,
a silicon-controlled rectifier rendered conductive by operation of said unijunction transistor, and
means connecting said silicon-controlled rectifier and control relay coil in parallel with said unijunction transistor for shutting off said unijunction transistor upon operation of said silicon-controlled rectifier.

11. A system for selecting an output circuit, as set forth in claim 10, wherein there is provided a protecting circuit to limit operation of said triggering means which includes:
a protecting relay operated by said application of input pulses to input circuits in each of said input circuit groups, and
a contact electrically coupled to said silicon-controlled rectifier and operated by said protecting relay for interrupting operation of said control relay coil and silicon-controlled rectifier.

12. A system for selecting an output circuit, as set forth in claim 11, wherein there is provided means for discharging the capacitor means, said discharging means comprising:

a first discharge circuit coupler across the capacitor means and including first normally open contact means closed by operation of said control relay coil for initiating discharge of the capacitor means, and a second discharge circuit for by-passing the first discharge circuit coupled across the capacitor means and including second normally open contact means closed by operation of said protecting relay for continuing discharge of the capacitor means.

13. A system for energizing one of a number of output circuits in response to an application of intelligence pulses to a plurality of input terminals selected from a larger group of input terminals of the system, the system including means responsive to said application for conditioning only said one output circuit for energization and also including control circuit means responsive to continuous application of the intelligence pulses simultaneously to said plurality of input terminals during a predetermined time period for energizing said conditioned one output circuit, said control circuit means comprising:

a capacitor coupled to be charged by said continuous simultaneous application, control means coupled to the capacitor and rendered effective upon continuous charging during said predetermined time period for initiating energization of said conditioned one output circuit, a unijunction transistor coupled to be operated upon the capacitor charging continuously during said predetermined time period, a silicon-controlled rectifier rendered conductive by operation of the unijunction transistor, and means connecting the silicon-controlled rectifier and the control means in parallel with the unijunction transistor for shutting off the unijunction transistor upon operation of the silicon-controlled rectifier.

References Cited

UNITED STATES PATENTS 2,637,017    4/1953    Holden _____ 340—167

THOMAS A. ROBINSON, Primary Examiner

U.S. Cl. X.R.

307—115; 317—135